March 15, 1949.  R. L. POTTER ET AL  2,464,718
METHOD AND APPARATUS FOR SHAPING SYNTHETIC RESINS
Filed June 24, 1946  2 Sheets-Sheet 1
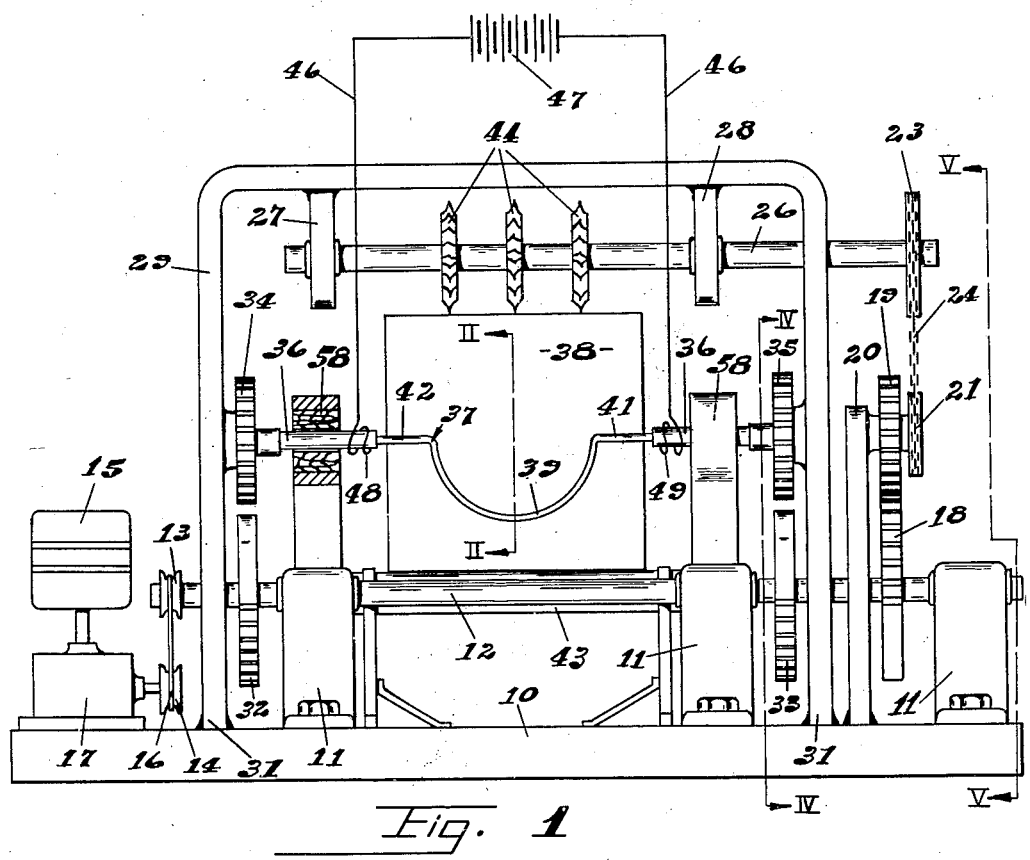
Fig. 1
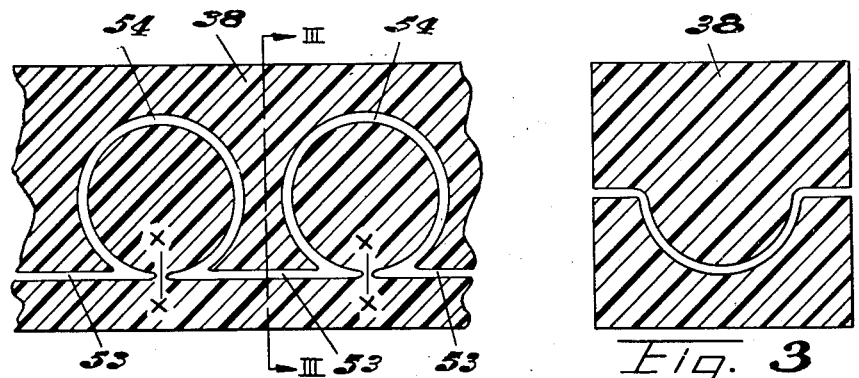
Fig. 2
Fig. 3
INVENTORS
RUSSELL L. POTTER
FERRIS C. HUBER
BY March 15, 1949. R. L. POTTER ET AL 2,464,718
METHOD AND APPARATUS FOR SHAPING SYNTHETIC RESINS
Filed June 24, 1946 2 Sheets-Sheet 2

INVENTORS
RUSSELL L. POTTER
FERRIS C. HUBER
BY

Patented Mar. 15, 1949

2,464,718

UNITED STATES PATENT OFFICE 2,464,718

METHOD AND APPARATUS FOR SHAPING SYNTHETIC RESINS

Russell L. Potter and Ferris C. Huber, Detroit, Mich.

Application June 24, 1946, Serial No. 678,928

10 Claims. (Cl. 25—109)

This invention relates to a method of and apparatus for shaping polymeric synthetic resins which are depolymerizable by heat, and to apparatus therefor.

The invention is particularly adaptable to cutting portions of a predetermined shape from a body of material comprising a polymeric synthetic resin which is depolymerizable at elevated temperatures. Such resins include styrene, esters of methacrylic acid and other compounds. Specifically, the invention is shown in the accompanying drawings and will be described herein as applied to the cutting of polymeric, cellular plastics in foam form, such as styrene foam made by the Dow Chemical Company and sold under the tradename of "Styrafoam," although it will be apparent that solid synthetic resins of the polyvinyl acetate type may be cut or shaped in a similar manner.

It is an object of the invention to provide an improved method of cutting polymeric synthetic resins which are depolymerizable at elevated temperatures.

Another object of the invention is to provide an apparatus which will automatically and continuously effect the cutting of polymeric synthetic resins into predetermined shapes.

A further object of the invention is to provide an apparatus of the above character with a heated cutting tool which will effect the depolymerization of polymeric resins along its path of travel with respect to a block and to have the various parts of the apparatus so connected, arranged and synchronized as to prevent charring, burning or discolorization of the resinous body.

Other objects and advantages of the invention will become apparent from a reading of the following description taken in connection with the accompanying drawings in which:

Figure 1 is an end elevational view of the apparatus comprising the invention.

Figure 2 is a fragmentary vertical sectional view taken substantially along the line II—II of Figure 1 and showing certain cuts made in the resinous material as it is advanced through the apparatus.

Figure 3 is a transverse, vertical sectional view through a body of resinous material and taken substantially along the lines indicated at III—III in Figure 2.

Figure 4:
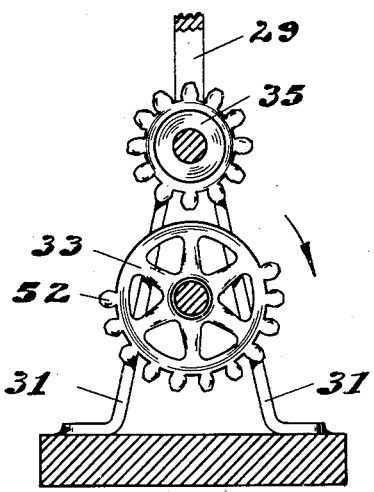
Figure 4 is a view of the apparatus taken on the line IV—IV of Figure 1.

Referring now to the drawings, reference numeral 10 indicates a base plate having suitably mounted thereon a plurality of spaced, transversely aligned bearing brackets 11 which carry a rotatable, transversely extending driving shaft 12. One end of the shaft 12 may carry a pulley 13 which in turn may be connected by means of a V belt 16 to a suitable gear box 17 which is in turn operatively connected with electric motor 15 or other suitable source of power. Adjacent the opposite end of the driving shaft 12, a toothed wheel 18 is mounted to rotate therewith and is adapted to intermittently drive an idler gear 19 suitably carried by an upstanding support 20 and mounted to be freely rotatable with respect thereto. A sprocket wheel 21 is carried by the gear 19 to rotate therewith in concentric relation and is connected by a chain 24 to drive a sprocket wheel 23. The sprocket wheel 23 is fixed to one end of a transversely extending, rotatable, driven shaft 26 suitably mounted in bearing brackets 27 and 28 carried by an inverted U-shaped supporting frame 29 which in turn is supported on the bed plate 10 by spaced legs 31. Another pair of driving gears 32 and 33 are mounted upon the driving shaft 12 in relative spaced relation to rotate therewith and are adapted to drive a pair of driven gears 34 and 35, respectively, which are rotatably carried by the leg supports 31.

The invention contemplates the provision of a metal cutting tool which is heated and maintained at a temperature substantially equal to, or slightly above, the decomposition temperature of the resinous material being worked. To this end, a cutting wire 37, of sufficient rigidity to resist distortion under the slight pressure incident to the cutting operations may extend transversely of the apparatus between the shaft members 36, which members are supported by the bearings 38 and carry the gears 34 and 35 at their respective ends opposite the cutting wire. The cutting wire 37 may be heated to the desired temperature in any conventional manner, such as that schematically illustrated in Figure 1 wherein electrical conductors 46 may lead from a suitable source of electrical potential 47 and be connected to the cutting wire 37 in any conventional way as by the loops 48 and 49, or by slip rings and brushes, through the shaft members 36. Suitable insulating means will need to be provided to direct the current flow through the desired path. This may be done in any of several ways of which the one used in our preferred embodiment of our invention comprises providing wood, preferably oak, liners in the bearings 58 and making the gears 34 and 35 of an electrically non-conductive material, such as fiber.

The specific apparatus as herein described is designed to cut portions of spherical shape from a body of light, cellular plastic material 38. Accordingly, substantially midway between its ends, the cutting wire 37 is formed with a semicircular loop 39 adapted to form a spherical cut in the material 38 as will later more fully appear. It will be observed that the cutting wire 37 is also so shaped and proportioned that the axially aligned portions thereof, as 41 and 42, form cutting surfaces to horizontally divide the block 38 to permit passage of said wire and to facilitate removal of the cut-out portions of material.

In passing through the apparatus, the body of material 38 may rest and travel upon any convenient conveyor 43, as a slide, and may be advanced on the conveyor by a series a toothed wheels 44 mounted upon the shaft 26 to be driven thereby and arranged to engage the material.

Preferably, the cutting wire 37 is maintained at a temperature sufficiently above the depolymerization temperature of the resinous material 38 so that substantially immediate depolymerization of the resin is effected. In order to prevent charring or discoloration of the material adjacent the cuts made therein, it is essential that relative movement at all times be maintained between the block of material 38 and the cutting wire 37, that is, the block of material must be advancing when the cutting wire is stationary and the cutting wire must begin its rotary movement just prior to the moment in which the material ceases to advance.

To effect such relative movement and synchronization, only a segmental portion of the driving gear wheel 18, which effects the advancement of the block of material 38, is provided with gear teeth 49, leaving the remaining peripheral portion of the wheel smooth and toothless. In the present instance, the gear wheel 18 is provided with one-half the number of teeth which would ordinarily be formed on a full gear so that as the wheel 18 rotates with the driving shaft 12, the idler gear 19 is intermittently driven thus causing the body of material 38 alternately to advance and stop.

Likewise, the gears 32 and 33 have only approximately one-half of the normal complement of teeth, which are so positioned with respect to the teeth of the gear 18 that the gear 19 turns with approximately one-half of each rotation of the shaft 12 and the gears 34 and 35 turn with approximately the other half of each rotation of the shaft 12.

To insure the initiation of rotation of the wire cutting loop 39 slightly before the advancement of the body of material 38 ceases, the driving gears 32 and 33, are each provided with one more gear tooth than the driving member 18 and are positioned upon the driving shaft 12 in such angular relation with respect to the driving member 18 that the teeth 52 of the gear wheels 32 and 33 will engage the teeth of their complementary gears 34 and 35 slightly before the teeth 49 of the driving member 18 disengage the teeth 51 of the idler gear 19. Further, the teeth 52 of the gears 32 and 33 will disengage the teeth of the gears 34 and 35 slightly after the teeth 49 of the driving gear 18 engage the teeth 51 of the idler gear 19.

Figure 5:
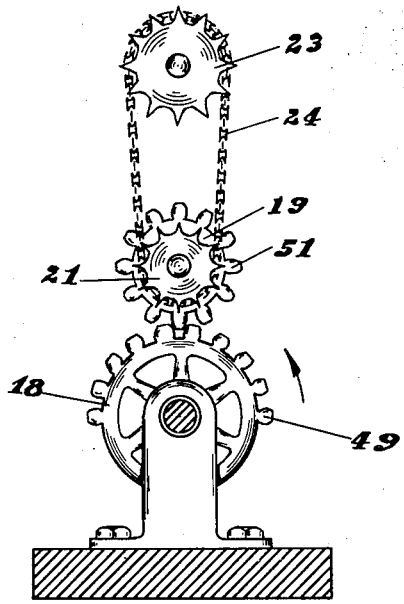
Figure 5 is an end elevational view of the apparatus taken substantially on the line V—V of Figure 1.

Assuming now that the parts are in the relative positions shown in Figure 1 and that the driving shaft 12 is rotating in a clockwise direction as viewed from the left in Figure 1, the driving gears 32 and 33 and their complementary gears 34 and 35 will be in substantially the relative positions shown in Figure 4 and the cutting wire will be stationary. The gears 18 and 19 for advancing the body of material 38 will be in substantially the relative positions shown in Figure 5 and the material will be advancing, through the medium of the driving wheels 44, against the stationary cutting wire 37. When viewed from the position of Figure 3, the loop 39 and the portions 41 and 42 of the cutting wire 36 will make a straight, longitudinal cut of the shape shown. When viewed from the position of Figure 2, the loop portion 39, being stationary, will effect a cut in the advancing material substantially as shown at 53. When the loop 39 approaches almost to the point indicated by the lines $x-x$ in Figure 2, the teeth 52 of the driving gears 32 and 33 will engage the teeth of the gears 34 and 35, respectively, and the cutting wire will begin to rotate upon its axis. Immediately thereafter the teeth 49 of the driving gear 18 will disengage the teeth 51 of the idler gear and the body of material 38 will be held stationary. As the cutting wire 37 is rotated upon its axis the loop portion 39 will be moved in a complete circular path. Due, however, to the synchronization of the driving gears 18 and 32 and 33, by which the body of material 38 will begin to advance a moment before the wire loop 39 entirely completes its cycle of rotation, there remains, bisected by the line $x-x$, a small uncut portion which will provide a temporary support for the piece being shaped. Immediately after the material begins to advance, rotation of the wire loop 39 ceases and the cycle of operation is repeated. It will be obvious that as the body of material 38 is advanced through the apparatus, a series of spherical portions will automatically be cut therefrom and the sides of the body will be horizontally cut, as shown in Figure 3, so that it is divided into separable halves from which the cut-out portions may be readily broken out.

It will be understood that by suitable modification of the cutting wire 37, any shape may be cut providing only it has a circular cross-section.

It will be observed that there will be several ways equivalent to the one here shown of effecting the relative relationship as described between the rotation of the cutting wire and the advancement of the foam block. Electrical controls with switches operated by suitably timed cams, or hydraulic controls operating by suitably timed rotating valves, are examples of other means for accomplishing the above described results.

Various other modifications in the method and in the construction and design of the specific apparatus as herein described and illustrated, will immediately suggest themselves to those skilled in the art but it is to be understood that the invention is to be limited only by the spirit and scope of the appended claims.

What is claimed and desired to be secured by Letters Patents is:

1. In a method of separating a body of polymeric synthetic resin subject to depolymerization by heat, the steps which comprise: bringing said body into direct contact with a metal tool heated to a temperature at least as high as the depolymerization temperature of said resin, moving said body a predetermined distance with respect to said tool, starting the movement of said tool through a circular path with respect to and within said body and immediately thereafter stopping the advancement of said body, continuing the relative movement of said tool in said circular path, starting the advancement of said body and immediately thereafter stopping the movement of said tool.

2. In apparatus for cutting a body of depolymerizable synthetic resin, the combination comprising: a cutting tool mounted for rotation about a center; a conveyor for guiding and supporting said body in a selected cutting relationship with said tool; means effecting movement of said body along said conveyor with respect to the center of rotation of said cutting tool; driving means rotating said tool and other driving means moving the body with respect to said center of rotation, each of said driving means including mutilated gears providing substantially alternate rotation and moving, the mutilated gear associated with the tool rotating driving means having less teeth thereon than the mutilated gear associated with the body moving driving means and operatively positioned with respect thereto so that rotation of the tool will start before the moving of the body ceases and said moving will resume before said rotation ceases.

3. In a method of separating into substantially circular portions a bar-shaped body of polymeric synthetic resins subject to depolymerization by heat, the steps which comprise: moving said body into direct contact with a rod-shaped metal tool heated to a temperature at least as high as the depolymerization temperature of said resins; intermittently advancing said body with respect to said tool; rotating said tool within said body while said body is stationary.

4. In a method of separating into substantially circular portions a bar-shaped body of polymeric synthetic resins subject to depolymerization by heat, the steps which comprise: moving said body into direct contact with a rod-shaped metal tool heated to a temperature at least as high as the depolymerization temperature of said resins; intermittently advancing said body with respect to said tool; rotating said tool within said body while said body is stationary; overlapping said movements so that the tool is constantly in motion with respect to said body.

5. In a method of separating into substantially circular portions a bar-shaped body of polymeric synthetic resins subject to depolymerization by heat, the steps which comprise: moving said body into direct contact with a rod-shaped metal tool heated to a temperature at least as high as the depolymerization temperature of said resins; intermittently advancing said body with respect to said tool; rotating said tool within said body while said body is stationary; overlapping said movements so that the tool is constantly in motion with respect to said body and so that the body will resume movement slightly before the tool has completed a full circle of rotation by which a small portion of unseparated material is left to temporarily hold the otherwise separated parts in continued fixed relation to each other.

6. In apparatus for separating a body of depolymerizable synthetic resin, the combination comprising: a separating tool mounted for rotation about a center; means for heating said tool to a temperature at least as high as the depolymerization temperature of said resin; a conveyor for guiding and supporting said body in a selected separating relationship with said tool; means effecting movement of said body along said conveyor with respect to the center of rotation of said separating tool; driving means rotating said tool and other driving means moving the body with respect to said center of rotation, each of said driving means including mutilated gears providing substantial alternate rotation and moving, the mutilated gear associated with the tool rotating driving means having less teeth thereon than the mutilated gear associated with the body moving driving means and operatively positioned with respect thereto so that rotation of the tool will start before the moving of the body ceases and said moving will resume before said rotation ceases.

7. In apparatus for separating a body of depolymerizable synthetic resin, the combination comprising: a separating tool mounted for rotation about a center; means for heating said tool to a constant temperature held at a point at least as high as the depolymerization temperature of said resin; a conveyor for guiding and supporting said body in a selected separating relationship with said tool; means effecting movement of said body along said conveyor with respect to the center of rotation of said separating tool; driving means rotating said tool and other driving means moving the body with respect to said center of rotation, each of said driving means including mutilated gears providing substantial alternate rotation and moving, the mutilated gear associated with the tool rotating driving means having less teeth thereon than the mutilated gear associated with the body moving driving means and operatively positioned with respect thereto so that rotation of the tool will start before the moving of the body ceases and said moving will resume before said rotation ceases.

8. In apparatus for separating a body of depolymerizable synthetic resin, the combination comprising: a separating tool mounted for rotation about a center; means for heating said tool to a temperature at least as high as the depolymerization temperature of said resin; a conveyor for guiding and supporting said body in a selected separating relationship with said tool; means effecting movement of said body along said conveyor with respect to the center of rotation of said separating tool, each of said driving means including means providing substantially alternate rotation and movement, the means associated with the tool rotary driving means being adapted to cooperate with suitably adapted means associated with the body moving driving means so that rotation of the tool will start before the moving of the body ceases and said moving will resume before said rotation ceases.

9. In apparatus for separating a body of depolymerizable synthetic resin, the combination comprising: a separating tool mounted for rotation about a center and comprising electrically conductive material having high resistance; means imposing an electrical potential across the portion of said tool which will span said body and sufficient to effect heating of said tool to a temperature at least equal to the depolymerizing temperature of said resin; a conveyor for guiding and supporting said body in a selected separating relationship with said tool; means effecting movement of said body along said conveyor with respect to the center of rotation of said separating tool; driving means rotating said tool and other driving means moving the body with respect to said center of rotation, each of said driving means including mutilated gears providing substantial alternate rotation and moving, the mutilated gear associated with the tool rotating driving means having less teeth thereon than the mutilated gear associated with the body moving driving means and operatively positioned with respect thereto so that rotation of the tool will start before the moving of the body ceases and said moving will resume before said rotation ceases.

10. In apparatus for separating a body of depolymerizable synthetic resin, the combination comprising: a separating tool mounted for rotation about a center and comprising electrically conductive material having high resistance; means imposing an electrical potential across the portion of said tool which will span said body and sufficient to effect heating of said tool to a temperature at least equal to the depolymerizing temperature of said resin; a conveyor for guiding and supporting said body in a selected separating relationship with said tool; means effecting movement of said body along said conveyor with respect to the center of rotation of said separating tool; each of said driving means including means providing substantially alternate rotation and movement, the means associated with the tool rotary driving means being adapted to cooperate with suitable adapted means associated with the body moving driving means so that rotation of the tool will start before the moving of the body ceases and said moving will resume before said rotation ceases.

RUSSELL L. POTTER.
FERRIS C. HUBER.

REFERENCES CITED

The following references are of record in the file of this patent:

UNITED STATES PATENTS

| Number | Name | Date |
|---|---|---|
| 479,663 | Riggs | July 26, 1892 |
| 705,067 | Gaynor, Jr. | July 22, 1902 |
| 2,187,836 | Miller | Jan. 23, 1940 |
| 2,293,178 | Stocker | Aug. 18, 1942 |
| 2,328,063 | Dodge | Aug. 31, 1943 |
| 2,438,156 | Dodge | Mar. 23, 1948 |